United States Patent [19]

Brown et al.

[11] Patent Number: 4,872,810
[45] Date of Patent: Oct. 10, 1989

[54] TURBINE ROTOR RETENTION SYSTEM

[75] Inventors: Wesley D. Brown, Jupiter; Edward C. Hill, Tequesta; Peter T. Vercellone, Lake Worth, all of Fla.

[73] Assignee: United Technologies Corporation, Hartford, Conn.

[21] Appl. No.: 284,269

[22] Filed: Dec. 14, 1988

[51] Int. Cl.[4] .............................................. F01D 5/26
[52] U.S. Cl. ............................... 416/145; 416/193 A; 416/220 R; 416/500
[58] Field of Search ................... 416/193 A, 500, 145, 416/220 R

[56] References Cited

U.S. PATENT DOCUMENTS

| 3,748,060 | 7/1973  | Hugoson et al.  | 416/193 A X |
| 3,887,298 | 6/1975  | Hess et al.     | 416/193 A X |
| 4,101,245 | 7/1978  | Hess et al.     | 416/193 A X |
| 4,182,598 | 1/1980  | Nelson          | 416/193 A   |
| 4,343,594 | 8/1982  | Perry           | 416/193 A   |
| 4,355,957 | 10/1982 | Sifford et al.  | 416/145     |
| 4,422,827 | 12/1983 | Buxe et al.     | 416/193 A   |
| 4,455,122 | 6/1984  | Schwarzmann     | 416/193 A   |
| 4,505,642 | 3/1985  | Hill            | 416/193 A   |
| 4,568,247 | 2/1986  | Jones et al.    | 416/193 A   |
| 4,743,164 | 5/1988  | Kalogeros       | 416/193 A   |

Primary Examiner—Everette A. Powell, Jr.
Attorney, Agent, or Firm—Norman Friedland

[57] ABSTRACT

Damping of a turbine rotor is attained by a weighted member trapped between pockets formed in the neck of adjacent blades at one end and a space between the disk and TOBI rotor seal and forward extending blade lug at the other end. The feather seal which is a curved plate fits over the top of the weighted member and is trapped between nubs formed on the front and rear underside of the blade platform. The front face of the rim of the disk at the disk cavity is open ended and blocked off at the rear face. This assembly allows for individual blade removal and viewing from the rear face by removing a single rim cavity cover without disturbing the remaining components of the assembly. The inverted ring supports take up the axial loads alleviating the loads heretofore taken up by the TOBI rotor seal, allowing for a lighter weight installation.

10 Claims, 3 Drawing Sheets

TURBINE ROTOR RETENTION SYSTEM

This invention was made under a U.S. Government contract and the U.S. Government has rights herein.

DESCRIPTION

Technical Field

This invention relates to gas turbine engines and particularly to the rim configuration of the disk of the turbine rotor and retention means of the blades, seals and dampers.

BACKGROUND OF THE INVENTION

With the advent of high speed aircraft with its advanced type of engines, in order to enhance the high cycle fatigue life of component parts, particularly the turbine rotor blades, it has become necessary to incorporate damping techniques so as to reduce vibratory stresses occasioned by the higher speeds. For turbine rotors that utilize fir tree attachments to secure the blades to the disk, such dampers have been incorporated in the space between blades at the blade root/disk attachment sections. Examples of dampers of this sort are disclosed in U.S. Pat. Nos. 4,182,598 entitled "Turbine Blade Damper" granted to C. J. Nelson on Jan. 8, 1980, 4,101,245 entitled "Interblade Damper and Seal for Turbomachinery Rotor" granted to J. R. Hess and H. F. Asplund on July 18, 1978, 4,455,122 entitled "Blade to Blade Vibration Damper" granted to R. A. Schwarzmann and H. J. Lillibridge on June 19, 1984, and 3,887,298 entitled "Apparatus for Sealing Turbine Blade Damper Cavities" granted to J. R. Hess and J. R. Kozlin on June 3, 1975, all of which are assigned to United Technologies Corporation, the assignee of this patent application.

While those embodiments exemplified in the above noted patents disclose means for achieving damping, they all to some extent require complex means of assembly and disassembly necessitating the removal of more than one blade to replace another blade or component in the disk/blade assembly, or to install a blade, damper and/or seal.

We have found that we can provide an improved retention system for the turbine rotor components by incorporating a unique rim configuration that employs snap rings to secure the blades in the disk. To this end, rearward retention of the blades is by a snap ring supported by hooks integral to the rear of the disk, and forward blade retention is by an inverted snap ring supported by a lug integral to the front of the disk lug. In this configuration the axial retention of the blades is provided by this snap ring and not the TOBI (Tangential On Board Injector) rotor seal which has been the common heretofore practice. To have designed the system incorporating heretofore design practices would have added an intolerable amount of weight to be capable of absorbing these axial loads. Among the advantages afforded by this inverted snap ring are:

(1) improved producibility of the snap ring groove,
(2) lighter weight than heretofore known retention systems, and
(3) full ring support for the snap ring for improved durability, leakage control and life.

This invention also contemplates an easily accessible damper and interstage platform seal which facilitates the assembly and disassembly of those components without the necessity of removing more than one blade. Hence, individual blades can be installed and removed without disrupting the rotor or changing the dynamics of the rotor. By virtue of this invention, a significant improvement in turbine maintainability and assembly is evidenced coupled with a reduction in tooling requirements and a less complex rim assembly.

DISCLOSURE OF THE INVENTION

An object of this invention is to provide a improved retention system for securing the blades to the disk of a turbine rotor for a gas turbine engine.

A feature of this invention is to secure the blades in the forward direction, relative to the direction of the engine's gas path, by an inverted snap ring fully supported in a disk lug that absorbs any vibratory axial loads of the blades, which improves the producibility of the snap ring groove, reduces weight of the rotor and improves the durability and life of the retention system.

Another feature of this invention is to secure a free floating damper by trapping it in the disk rim cavity between cast pockets in the necks of adjacent blades and an extended lug on the front of each blade and the TOBI seal rotor outer flange.

Still another feature of this invention is to provide means for supporting the interplatform seal adjacent the undersurface of the platform to extend across the gap between platforms. Nubs cast on the underside of the platform and a buttress on the rear of the platform provide a retention and orientation system for the seal which may be assembled and disassembled from either the front or rear end of the disk. The retention system for the damper and seals affords easy access of these components which allows the removal and installation of individual blades.

The foregoing and other features and advantages of the present invention will become more apparent from the following description and accompanying drawing.

BEST MODE FOR CARRYING OUT THE INVENTION

Figure 1:
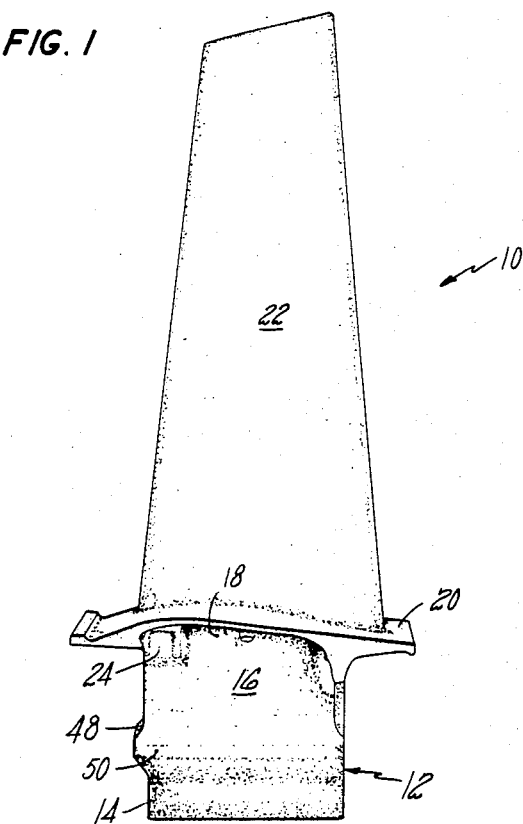
FIG. 1 is a view in elevation of the blade.

For an understanding of the invention, reference is being made to FIGS. 1-6 of the drawings. As is well known, the turbine of a gas turbine engine is comprised of a disk supported to the engine shaft that supports a plurality of radially projecting turbine blades uniformly mounted about the circumference of the disk and supported thereto in fir tree broaches formed in the disk. The blade 10 itself, as shown in FIG. 1, consists of a root generally illustrated by reference numeral 12 having a conventional fir tree shaped section 14 extending radially in the neck 16 of the blade 10 and configured to fit into the fir tree broach in the disk. A depression 18 in the neck 16 of the blade 10 adjacent the rim of the disk defines a cavity which is directly under the platform 20. The platform 20 extends circumferentially and axially from the airfoil 22 of the blade 10 and overlies the rim of the disk. The platform of the next adjacent blade abuts the side surface of the platform of its adjacent blade and leaves a laterally extending gap which is sealed by sealing mechanism to be described hereinbelow.

Figure 2:
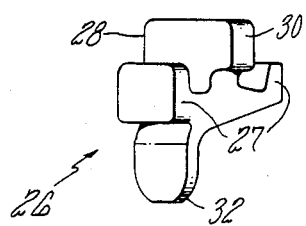
FIG. 2 is a perspective view of the damper.
Figure 5:
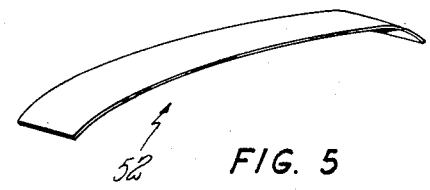
FIG. 5 is a perspective view of the interstage seal.
Figure 3:
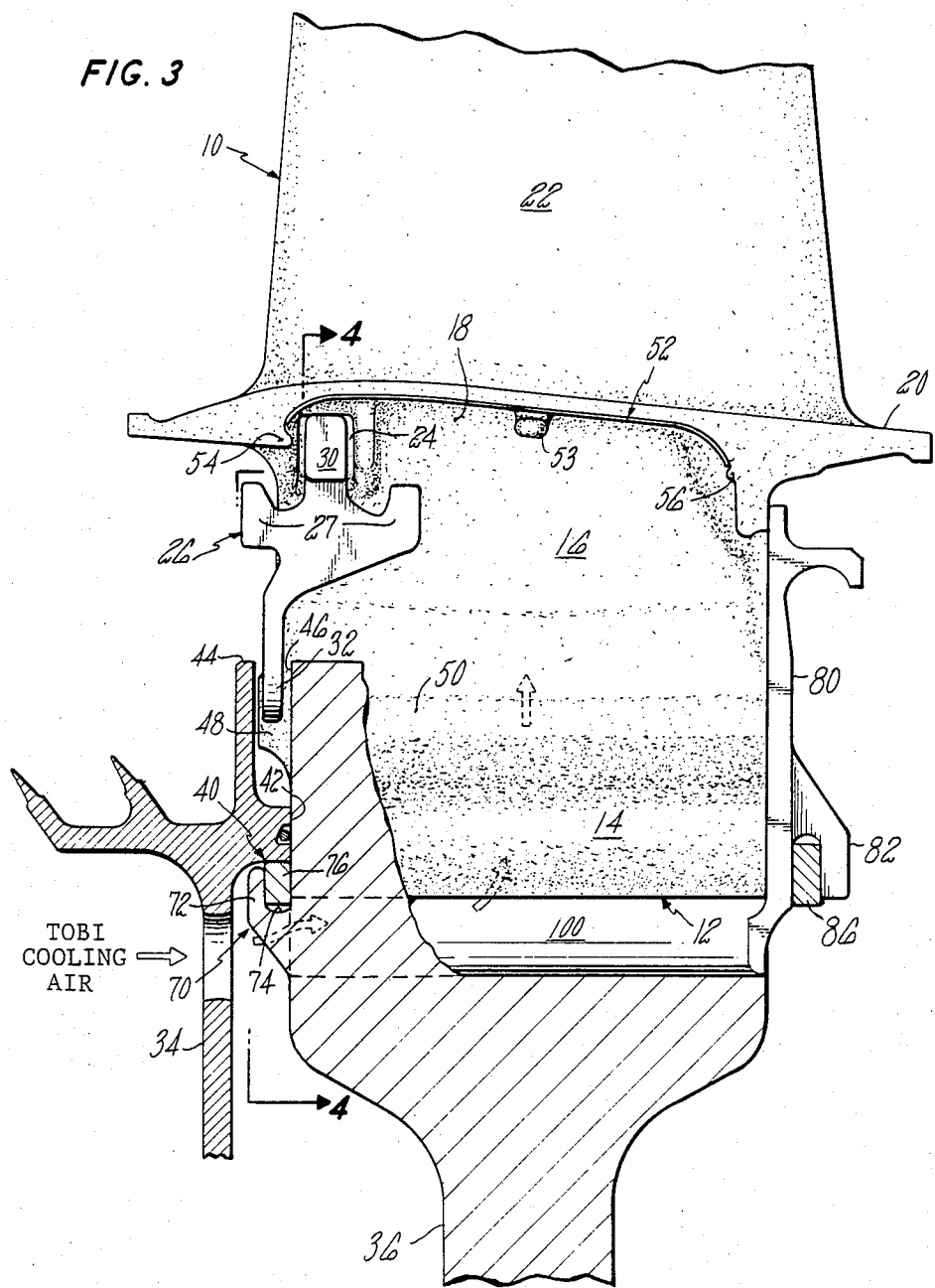
FIG. 3 is a partial view in section and elevation showing the disk, blade, TOBI seal, rotor and retention system.
Figure 4:
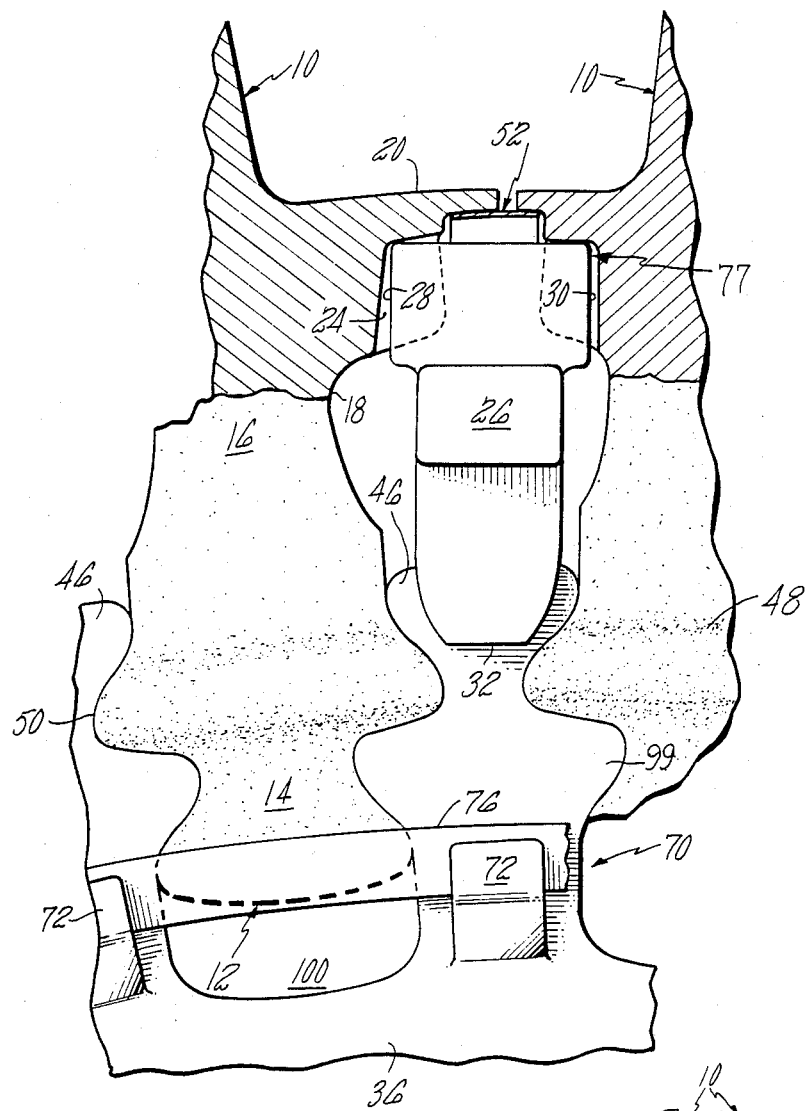
FIG. 4 is a sectional view taken substantially along the lines 4—4 of FIG. 3 with the damper shown in full.
Figure 6:
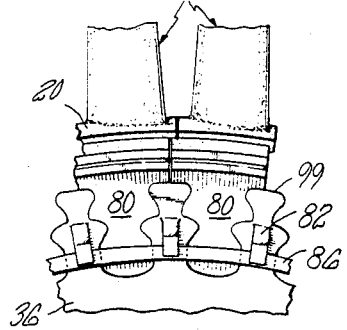
FIG. 6 is a partial rear end view of the rim and assembled rotor.

As noted from FIG. 1 and in accordance with this invention, the blade 10 has cast therein a pocket 24 adapted to receive the outer diameter of damper 26 (FIG. 2). Each of the blades has identical pockets cast on the forward and rearward faces of the neck. The side edges 28 and 30 of damper 26 are adapted to fit into these pockets which provide axial and circumferential positioning of the outside diameter of the damper 26 (see FIGS. 3 and 4). The inner leg 32 of damper 26 is captured between the annular shaped TOBI seal rotor 34 which is secured in any well-known manner to the disk 36, or splined to the shaft common to the shaft to which disk 36 is mounted. Suffice it to say TOBI seal rotor 34 and disk 36 rotate at the same RPM. The outer diameter of TOBI seal rotor 34 carries a rim 44 that has a rear face 42 that bears against the side face of disk 36, but is designed so as not to absorb the loads generated by the blades. Extending from the rim but spaced from the rear face 42 is a radially extending annular portion 44 that, together with the end face 46 of disk 36 and the extended portion 48 formed on the side face of lug 50 of the fir tree 14 of blade 10, defines a pocket receiving the inner leg of damper 26. This pocket, provided by the TOBI rotor seal and extended blade lug, provides axial and circumferential positioning of the inner diameter portion of damper 26. This method of retention allows the damper to seat freely on pocket base 77 without restraint to achieve effective damping, thus dissipating the energy of the vibrations of the blades, but still prevents the damper from separating from the rotor or locking up. The damper 26 is contoured to include central extensions 27 that provide sufficient mass in the proper location to attain the desired centrifugal load, which in conjunction with the friction induced component damps out vibratory stresses produced by the blades.

As mentioned above, the gap between the platform 20 is sealed by a relatively thin, generally flat member 52 that is contoured to fit and be trapped on the underside of the platform by using a cast seal finger 60 extending radially downwardly from the platform and leading edge nub 54 and trailing edge nub 56. The seal member 52 (see FIG. 3) is installed from the front of the disk 36 through a gap formed between the seal finger 53 and platform 20 and slides along the platform until it strikes the rear buttress nub 56. The trailing edge nub 56 prevents seal 52 from leaving the rear of the blade. With the platform seal 52 against the rear buttress, an installation pressure exerted outwardly against the forward edge of seal 52 will seat the seal member 52 to the inner surface of the platform 20. Likewise, the leading edge nub 54 prevents the seal member 52 from coming out the front of the platform 20.

Removal of the seal member 52 is a relatively simple procedure. It requires sliding a tool between the blade platform that flexes the forward edge of the seal member 52 over the leading edge nub 54. The seal member 52 can then be easily gripped and removed by the operator.

As is apparent from the foregoing, retaining the seal member 52 and damper 26 in the manner described hereinabove allows installation and removal of individual blades and greatly reduces the effort necessary to maintain the turbine since the tooling requirements are reduced and the rim assembly is less complex than heretofore known systems.

As was described above, the retention system for securing the blades 10 to the disk 36 is designed so that any load imposed by the blades is not absorbed by the TOBI rotor seal 34, but rather is absorbed by the snap ring assembly generally illustrated by reference numeral 70. In this assembly, an interrupted annular lug 72 with a complete groove cross-section 74 is integral to the front face of each disk lug 99. A full ring 76 fits into this complementary groove 74 and bears against the side face of the fir tree root section 14 of blade 10. The full ring is retained radially by the rim 40 of the TOBI rotor seal 34 overlying the groove 74 and is designed to resist the loads imparted by the rotating blades 10. As is apparent from the drawing, the groove 74 faces away from the engine's center line and hence is viewed as being inverted since it is typical to orient the slots and grooves to face the center line of the engine. This serves to improve producibility of the grooves since it facilitates the manufacturing thereof, reduces weight, and improves the life of the assembly since the ring supports the blades over the entire circumference.

According to this invention, sealing of the dead cavity adjacent the juncture of the blade roots and disk rim is by use of a plurality of individual seal plates 80 (FIGS. 3 and 6) supported on the rear face of disk 36. Each plate is contoured to fit into the space adjacent the root of blades 10 and are retained by hooks 82 integral to the rear face of disk lugs 99 of disk 36. The hooks' slots support the full split snap ring 86 which bear against each of the plates 80. This system supports the aerodynamic thrust load of the blades 10, while sealing up the dead rim cavity. To remove dampers 26, this snap ring 86 and seal plates 80, need not be disturbed.

On the other hand in the preferred instances it may be advantageous to view into the dead rim cavity or cooling air supply slot 100 by removing snap ring 86 and seal plates 80 without disturbing the dampers 26 or TOBI seal rotor 34 such as may be required for trim balance operations. This seal plate installation is highly advantageous at a 0° fir tree broach angle, i.e. fir tree slot is perpendicular to disk face 46, since the seal plate is of lightest weight design. However, it is to be understood and as will be apparent to those skilled in the art, this invention can be employed where the broach angle is greater than 0°.

It is apparent from the foregoing that the rim configuration as described serves to allow individual blade installation and removal, blade-to-blade damping and platform sealing of an extended neck blade. In addition, and without limitation, this invention improves high cycle fatigue life while at the same time decreases weight over other heretofore known disk rim configurations.

Although this invention has been shown and described with respect to detailed embodiments thereof, it will be understood by those skilled in the art that various changes in form and detail thereof may be made without departing from the spirit and scope of the claimed invention.

We claim:

1. For a gas turbine engine having a turbine comprising a disk and a plurality of blades extending radially from and being circumferentially supported in the rim of the disk, means for absorbing excessive vibratory motions occasioned by the rotation of the turbine, said means including a damper formed from a weighted element having an inner diameter and outer diameter in its assembled position and opposing side walls, opposing pockets formed in the neck of each of said blades being dimensioned to accept the side walls of said element at its outer diameter, a TOBI rotor seal adjacent said disk and extending radially adjacent the necks of said blades and defining a cavity, the inner diameter of said element being trapped in said cavity, a lug on said blade extending axially toward said TOBI rotor seal and overlying a portion of said inner diameter of said element, whereby said element is trapped in the assembled position and movable between adjacent blades to absorb the energy induced by vibratory motion experienced by said turbine.

2. For a gas turbine engene as defined in claim 1, wherein said element includes a front face and rear face, centrally disposed axially extending portions on said elements adding weight thereto in a given amount and location to absorb the energy induced by said rotating turbine.

3. For a gas turbine engine as defined in claim 2, wherein said pockets are cast into said blades.

4. For a gas turbine engine as defined in claim 3, including a slotted annular inverted lug extending on the front face of said ring for receiving a retaining ring having a front face bearing against the front face of the root section adjacent said assembled blades and a rear face bearing against said lug for absorbing a portion of the axial load of said turbine.

5. For a gas turbine engine as in claim 4, including hooks extending from the rear face of each of the lugs of said disk for defining a track, a plurality of contoured shaped plate members fitted into the complimentary contour between said lugs of said disk for sealing the rear face of the disk rim cavity, split ring means supported in said track for supporting said plate members to block the flow of cooling air admitted into said rim cavity through the front face of said rim.

6. In combination, a damper and interplatform seal for a gas turbine engine having a turbine comprising a disk and a plurality of blades extending radially from and being circumferentially supported in the rim of the disk, means for absorbing excessive vibratory motions occasioned by the rotation of the turbine, said means including a damper formed from a weighted element having an inner diameter and outer diameter in its assembled position and opposing side walls, opposing pockets formed in the neck of each of said blades being dimensioned to accept the side walls of said element at its outer diameter, a TOBI rotor seal adjacent said disk and extending radially adjacent the necks of said blades and defining a cavity, the inner diameter of said element being trapped in said cavity, a lug on said blade extending axially toward said TOBI rotor seal and overlying a portion of said inner diameter of said element, whereby said element is trapped in the assembled position and movable between adjacent blades to absorb the energy induced by vibratory motion experienced by said turbine and each of said blades having a platform extending over the rim surface of said disk, said interplatform seal comprising a relatively flat rectangular plate member curved at either end fitting underneath adjacent platforms to seal the lateral extending gap between adjacent platforms, nubs formed on the forward and rearward underside surface of said platform for receiving and retaining said plate member, and a shelf defined by the top wall of said pockets defining a gap for permitting said plate member from sliding over the top surface of said damper.

7. For a gas turbine engine as defined in claim 6, wherein said element includes a front face and rear face, centrally disposed axially extending portions on said elements adding weight thereto in a given amount and location to absorb the energy induced by said rotating turbine.

8. For a gas turbine engine as defined in claim 7, wherein said pockets are cast into said blades.

9. For a gas turbine engine as defined in claim 8, including a slotted annular inverted lug extending on the front face of said ring for receiving a retaining ring having a front face bearing against the front face of the root section adjacent said assembled blades and a rear face bearing against said lug for absorbing a portion of the axial load of said turbine.

10. For a gas turbine engine as in claim 9, including hooks extending from the rear face of each of the lugs of said disk for defining a track, a plurality of contoured shaped plate members fitted into the complimentary contour between said lugs of said disk for sealing the rear face of the disk rim cavity, split ring means supported in said track for supporting said plate members to block the flow of cooling air admitted into said rim cavity through the front face of said rim.

* * * * *